United States Patent
Wang et al.

(10) Patent No.: US 10,599,905 B2
(45) Date of Patent: Mar. 24, 2020

(54) FINGERPRINT DETECTION CIRCUIT AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Haisheng Wang, Beijing (CN); Xue Dong, Beijing (CN); Hailin Xue, Beijing (CN); Xiaochuan Chen, Beijing (CN); Xiaoliang Ding, Beijing (CN); Yingming Liu, Beijing (CN); Shengji Yang, Beijing (CN); Weijie Zhao, Beijing (CN); Hongjuan Liu, Beijing (CN); Wei Liu, Beijing (CN); Changfeng Li, Beijing (CN); Pengpeng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 125 days.

(21) Appl. No.: 15/338,662

(22) Filed: Oct. 31, 2016

(65) Prior Publication Data
US 2017/0200036 A1    Jul. 13, 2017

(30) Foreign Application Priority Data
Jan. 13, 2016    (CN) .......................... 2016 1 0022264

(51) Int. Cl.
G06K 9/00    (2006.01)

(52) U.S. Cl.
CPC ................... *G06K 9/0002* (2013.01)

(58) Field of Classification Search
CPC .. G06K 9/0004; G06K 9/00006; G06F 3/044; G06F 3/042; G06F 2203/0338;
(Continued)

(56) References Cited

U.S. PATENT DOCUMENTS

| | | | |
|---|---|---|---|
| 2002/0159016 A1* | 10/2002 | Nishida | G02F 1/134363 349/141 |
| 2005/0031175 A1* | 2/2005 | Hara | G06K 9/0002 382/124 |

(Continued)

*Primary Examiner* — Mekonen T Bekele
*Assistant Examiner* — Michael J Vanchy, Jr.
(74) *Attorney, Agent, or Firm* — Ladas & Parry LLP; Frank Gao

(57) ABSTRACT

Disclosed is a fingerprint detection circuit and a display device. The fingerprint detection circuit comprises at least one fingerprint detection unit, the fingerprint detection unit comprising a switch transistor and a sensor capacitor, the fingerprint detection unit further comprising an output amplification element and a data input terminal for receiving a data signal, wherein a control terminal of the output amplification element is coupled with a terminal of the sensor capacitor, an output terminal of the output amplification element functions as an output terminal of the fingerprint detection unit, an input terminal of the output amplification element is coupled with the data input terminal, the output amplification element is configured for amplifying and outputting a current input to the output amplification element via the data input terminal.

16 Claims, 2 Drawing Sheets

(58) Field of Classification Search
CPC ....... G06F 21/32; G06F 3/03547; G01D 5/24; H01L 27/3248; H01L 27/3262; H01L 27/3265; H01L 2924/19041; H01L 2924/30105; G01N 27/228; G01R 27/26; H03K 17/223; H03K 19/00361
See application file for complete search history.

(56) References Cited

U.S. PATENT DOCUMENTS

| | | | | |
|---|---|---|---|---|
| 2005/0134294 A1* | 6/2005 | Ebihara | ............... | G01D 5/24 324/662 |
| 2009/0141004 A1* | 6/2009 | Yamazaki | ............ | G06F 3/0412 345/175 |
| 2011/0273410 A1* | 11/2011 | Park | ............... | H01L 25/167 345/204 |

* cited by examiner

FINGERPRINT DETECTION CIRCUIT AND DISPLAY DEVICE

FIELD OF THE ART

Embodiments of the invention relate to the field of fingerprint detection. More particularly, to a fingerprint detection circuit and a display device comprising the same.

BACKGROUND

Conventionally, a fingerprint detection circuit comprising a sensor capacitor is used to detect fingerprints lying on the fingerprint detection circuit.

When no finger lies on the fingerprint detection circuit, as illustrated in FIG. 1, a stable electric field is formed between a first terminal C1 of a sensor capacitor C and a second terminal C2 thereof. When a finger lies on the fingerprint detection circuit, a quantity of electricity stored in the sensor capacitor will be changed, thereby changing a current output by the fingerprint detection circuit. Valleys and ridges of the fingerprint have different influence on the sensor capacitor. As a result, the morphology of the fingerprint is determined by the amount of change of the current.

However, the conventional fingerprint detection circuit cannot identify morphology of fingerprints precisely.

SUMMARY

Embodiments of the invention provide a fingerprint detection circuit and a display device comprising the same which can precisely identify morphology of fingerprints.

According to a first aspect of the invention, there is provided a fingerprint detection circuit, which comprises at least one fingerprint detection unit, the fingerprint detection unit comprising a switch transistor and a sensor capacitor, the fingerprint detection unit further comprising an output amplification element and a data input terminal for receiving a data signal, wherein a control terminal of the output amplification element is coupled with a terminal of the sensor capacitor, an output terminal of the output amplification element functions as an output terminal of the fingerprint detection unit, an input terminal of the output amplification element is coupled with the data input terminal, the output amplification element is configured for amplifying and outputting a current input to the output amplification element via the data input terminal.

According to a second aspect of the invention, there is provided a display device which comprises the above fingerprint detection circuit.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. ""The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventor found that the reason that conventional fingerprint detection circuits cannot precisely detect patterns of fingerprints is due to that changes in currents through the fingerprint detection circuits are small, which makes it difficult to differentiate ridges and valleys of the fingerprints precisely.

Figure 1:
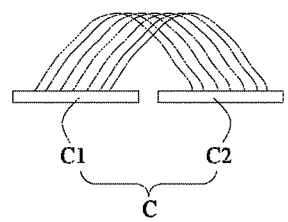
FIG. 1 schematically illustrates a fingerprint detection capacitor.
Figures 2, 3:
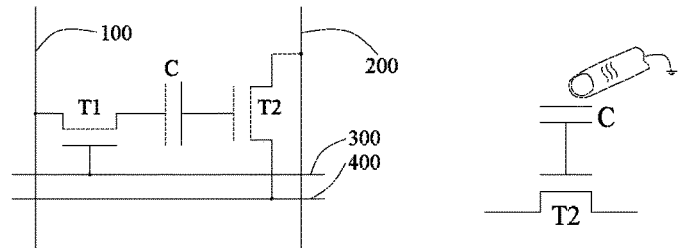
FIG. 2 schematically illustrates a fingerprint detection unit of a fingerprint detection circuit in accordance with an embodiment of the invention.
FIG. 3 schematically illustrates variation of gate voltage of a switch transistor of the fingerprint detection unit shown in FIG. 2.

An embodiment of the invention provides a fingerprint detection circuit. The fingerprint detection circuit comprises at least one fingerprint detection unit. As illustrated in FIG. 3, the fingerprint detection unit comprises a switch transistor T1 and a sensor capacitor C. A gate electrode of the switch transistor T1 functions as a control terminal of the fingerprint detection unit. A first electrode of the switch transistor T1 functions as a charging terminal of the fingerprint detection unit and a second electrode of the switch transistor T1 is coupled with a first terminal of the sensor capacitor C. The fingerprint detection unit further comprises an output amplification element T2 and a data input terminal for receiving a data signal. A control terminal of the output amplification element T2 is coupled with a second terminal of the sensor capacitor C, an input terminal of the output amplification element T2 is coupled with the data input terminal, and an output terminal of the output amplification element T2 functions as an output terminal of the fingerprint detection unit. The output amplification element T2 can amplify and output a current input to the output amplification element T2 via the data input terminal through a change in voltage at the control terminal (of the output amplification element T2) caused by change in the quantity of electricity stored in the sensor capacitor C.

After supplying an effective control signal to the control terminal of the switch transistor T1 and turning the switch transistor T1 on, the charging terminal of the fingerprint detection unit and the first terminal of the sensor capacitor C are electrically conducted, thereby charging the sensor capacitor C.

As the finger of an operation is grounded, when the finger of the operator is placed above the fingerprint detection unit, the quantity of electricity stored in the sensor capacitor C will be changed. A change in the quantity of electricity stored in the sensor capacitor C will cause a voltage at the second terminal of the sensor capacitor C to change. As the second terminal of the sensor capacitor C is coupled with the output amplification element T2, a change in a voltage at the control terminal of the output amplification element T2 will cause a current output by the output amplification element T2 to change. For example, a current input to the output amplification element through the data input terminal may be amplified and output, thereby obtaining a relatively large output current. As the induced current output by the fingerprint detection unit is larger, it can easily determine whether the fingerprint lying on the fingerprint detection unit is a valley or a ridge, which in turn helps to precisely determine the pattern of the fingerprint lying on the fingerprint detection unit.

In the embodiment, the induced current changes in accordance with the change of charges stored in the sensor capacitor.

The fingerprint detection circuit may comprise one or more fingerprint detection units. When the fingerprint detection circuit comprises one fingerprint detection unit, the complete finger morphology may be obtained by moving the finger of the operator above the fingerprint detection circuit.

Figure 6:
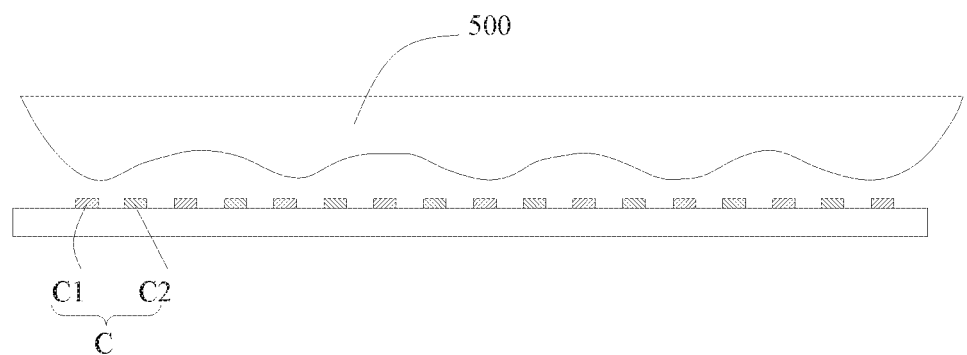
FIG. 6 schematically illustrates a fingerprint lying on a fingerprint detection circuit in accordance with an embodiment of the invention.

As illustrated in FIG. 6, the fingerprint detection circuit comprises a plurality of fingerprint detection units. When the finger 500 of the operator is placed above the fingerprint detection circuit, valleys and ridges of the fingerprint respectively correspond to the sensor capacitors C1 and C2. As a result, the complete finger morphology may be obtained by placing the finger overlaying the fingerprint detection circuit.

In at least some of embodiments, the fingerprint detection circuit may comprise a plurality of fingerprint detection units arranged in an array.

Figure 7:
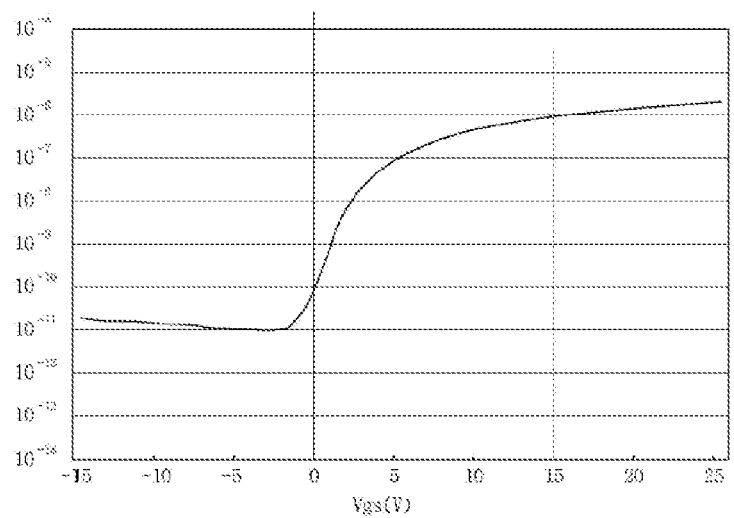
FIG. 7 schematically illustrates a relationship between a gate-source voltage of an amplifying component and operation states.

In the embodiments of the invention, specific configurations of the output amplification element T2 will not be defined herein. In at least some of embodiments, the output amplification element T2 is a triode, and the fingerprint detection unit further comprises a data input terminal for receiving data signals. A gate electrode of the output amplification element T2 functions as the control terminal of the output amplification element T2, a first electrode of the output amplification element T2 functions as its input terminal and is coupled with the data input terminal of the fingerprint detection unit, and a second electrode of the output amplification element T2 functions as the output terminal of the output amplification element T2. In this embodiment, the switch transistor T1, the output amplification element T2 and the sensor capacitor C form an amplifying common emitter. Moreover, the sensor capacitor C is capable of storing so much quantity of electricity that the output amplification element T2 operates in an amplifying region. FIG. 7 schematically illustrates a relationship between the gate-source voltage of the output amplification element T2 and operation states. In the embodiment, when the gate-source voltage Vgs of the output amplification element T2 is between 0 and 15 volts, the output amplification element T2 operates in the amplifying region.

When the fingerprint detection circuit provided by the embodiment of the invention is in operation, firstly, the switch transistor T1 is turned on, thereby charging the sensor capacitor C. Then the switch transistor T1 is turned off, and the quantity of electricity in the sensor capacitor C is maintained, the gate voltage of the output amplification element T2 remains the same, and the output amplification element T2 remains turned-on.

Before a finger of the operator touches the fingerprint detection unit, a capacitance of the sensor capacitor C is $C_0$, and a certain quantity of electricity Q is stored in the sensor capacitor C, therefore, the gate voltage U of the output amplification element T2 is $Q/C_0$. When the finger touches the fingerprint detection unit, the capacitance of the sensor capacitor C is $C_0+C_f$, where $C_f$ is a capacitance formed by the finger of the operator. At this time, the quantity of electricity stored in the sensor capacitor C is Q', the gate voltage U of the output amplification element T2 is $Q'/(C_0+C_f)$. As a part of the quantity of electricity stored in the sensor capacitor C is flowed to the ground by the finger, when the finger touches the fingerprint detection unit, the quantity of electricity stored by the sensor capacitor C is decreased (that is Q'<Q), and the capacitance is increased, $((C_0+C_f)>C_0)$. Therefore, when being touched by the finger, the gate voltage of the output amplification element T2 is smaller than that of the output amplification element T2 when no finger touches. When the change to the gate voltage of the output amplification element T2 is small, the change to the current output from the output amplification element T2 is relatively big. As a result, it can easily determine whether the fingerprint overlaying the fingerprint detection unit is a valley or a ridge of the fingerprint.

In at least some of embodiments, the output amplification element T2 is a thin film transistor.

Figure 4:
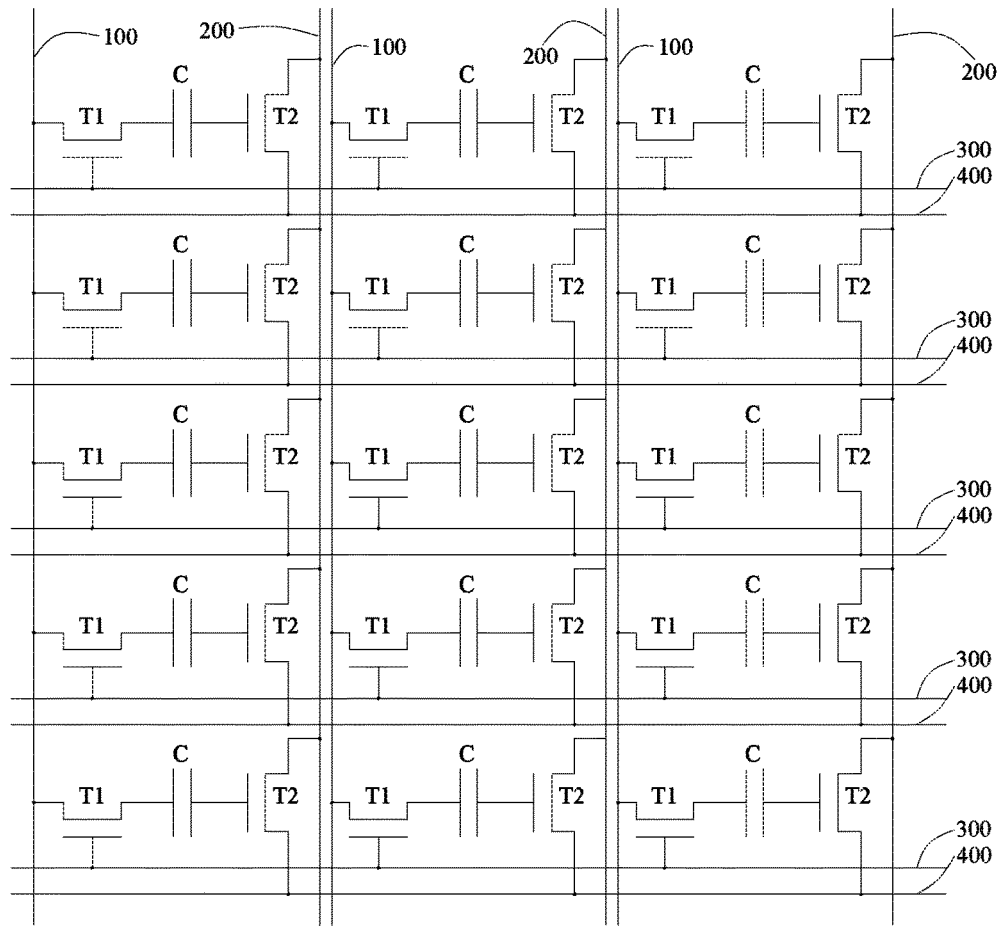
FIG. 4 schematically illustrates a part of a fingerprint detection circuit in accordance with an embodiment of the invention.

In at least some of embodiments, the fingerprint detection circuit may comprise a plurality of fingerprint detection units. For the convenience of control, as illustrated in FIG. 4, the fingerprint detection circuit further comprises a plurality of scan lines 300 and a plurality of data lines 400. A number of the data lines is the same as a number of rows of the fingerprint detection units. Fingerprint detection units located in a same row correspond to a same data line, and the first electrodes of the output amplification elements T2 located in the same row are coupled with the same corresponding data line 400. A number of the scan lines 300 is the same as the number of rows of the fingerprint detection units, fingerprint detection units in the same row correspond to a same scan line 300, and the gate electrodes of the switch transistors T1 located in the same row are coupled with the same corresponding scan line 300.

Control signals for turning the switch transistors T1 in the same row on or off are supplied thereto via the scan lines 300, and data signals are supplied to the output amplification element T2 via the data lines 400.

For the convenience of disposition and reducing an area occupied by the fingerprint detection circuit, in at least some of embodiments, the scan lines 300 and data lines 400 are arranged as parallel to each other.

To conveniently charge the fingerprint detection unit, in at least some of embodiments, the fingerprint detection circuit further comprises charging lines 100, a number of the charging lines 100 is the same as a number of columns of the fingerprint detection units, fingerprint detection units in a same column correspond to a same charging line 100, and charging terminals of the fingerprint detection units are coupled with the corresponding charging line 100.

To facilitate the collection of signals output by the fingerprint detection units, in at least some of embodiments, the fingerprint detection circuit further comprises output lines 200, a number of the output lines 200 is the same as a number of columns of the fingerprint detection units, fingerprint detection units in a same column correspond to a same output line 200, and output terminals of the fingerprint detection units are coupled with the corresponding output line 200.

In the same column of fingerprint detection units, switch transistors T1 of fingerprint detection units in different rows are turned on at different times. Therefore, at a time, only one of fingerprint detection units in the same column of fingerprint detection units outputs a signal to the output line 200.

To facilitate the configuration, in at least some of embodiments, the charging lines 100 and the output lines 200 are arranged in parallel. For the same column of fingerprint detection units, the charging lines 100 and output lines 200 are disposed on both sides of the column of fingerprint detection units respectively.

In at least some of embodiments, for the same column of fingerprint detection units, a distance between the charging lines 100 and output lines 200 is 40 μm~60 μm. It is thus seen that a width of a single fingerprint detection unit is 40 μm~60 μm. Configuring the width of the fingerprint detection unit within the above range helps the detection of fingerprints. Moreover, in this case, sizes of respective component in the fingerprint detection unit will not be too small, which makes the fabrication of the fingerprint detection unit easier. For example, in at least some of embodiments, the width of one fingerprint detection unit may be approximately 50 μm.

For the convenience of disposition, in at least some of embodiments, when the fingerprint detection circuit comprises the scan lines 300, extension directions of the charging lines 100 and the scan lines 300 intersect each other. In at least some of embodiments, the charging lines 100 and scan lines 300 are perpendicular to each other.

Figure 5:
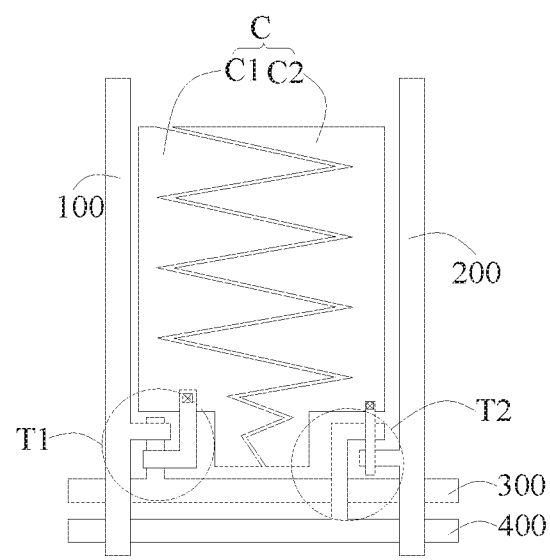
FIG. 5 schematically illustrates a configuration of the fingerprint detection unit of FIG. 3.

To increase mutual capacitance, in at least some of embodiments, as illustrated in FIG. 5, the first terminal C1 of the sensor capacitor C comprises first sensor fingers protruding towards the second terminal C2 of the sensor capacitor C, the second terminal C2 of the sensor capacitor C comprises second sensor fingers protruding towards the first terminal C1 of the sensor capacitor C. The first sensor fingers and the second sensor fingers are arranged alternately. It is seen from FIG. 5 that both the first terminal C1 and the second terminal C2 of the sensor capacitor C are saw tooth shaped. Moreover, in the embodiment illustrated in FIG. 5, the first terminal C1 of the sensor capacitor C is electrically coupled with the second electrode of the switch transistor T1 through a via hole, and the second terminal C2 of the sensor capacitor C is electrically coupled with the gate electrode of the output amplification element T2 through a via hole.

In at least some of embodiments, when the fingerprint detection circuit provided by the embodiments of the invention is disposed in a display region of a display device, for the purpose of not influencing normal display by the display device, both the first terminal C1 and the second terminal C2 of the sensor capacitor C are made of a transparent conductive material.

In the fingerprint detection circuit provided by the embodiment of the invention as shown in FIG. 4, it is seen that fingerprint detection points comprises 15 fingerprint detection units arranged into 5 rows and 3 columns. Each row of fingerprint detection units has corresponding scan line 300 and data line 400, each column of fingerprint detection units has corresponding charging line 100 and output line 200. The data lines 400 may be coupled with a chip providing a constant data signal The charging lines 100 may be coupled with a DC power source. An output module may be disposed at one of terminals of the output lines 200, the output module is configured for transmitting signals output from the output lines 200 to an analyzing chip for computing morphology of fingerprint. In at least some of embodiments, the fingerprint detection circuit may further comprise a shift register. The shift register includes a multiple stage of cascade shift register units. The multiple stage of shift register units are coupled with the multiple scan lines 300 in one to one correspondence, thereby providing scan signals to the scan lines 300 row by row.

Switch transistors T1 on a scan line 300 receives the scan signal and are turned on, thereby charging sensor capacitors in that row. After charging is finished, the switch transistors T1 on the scan line 300 are turned off. When the finger of the operator overlays fingerprint detection units corresponding to this row of scan line, the quantity of electricity stored in the sensor capacitors C will be changed, which further causes the gate voltage of the output amplification element T2 to change. The output amplification element T2 is operating in the amplifying region now, the change in gate voltage will cause the current output from the output line 200 to be changed more significantly. By analyzing change in currents on each of output lines 200 before and after touching, it can determine the morphology of the fingerprint on respective fingerprint detection units.

By providing scan signals to respective rows of scan lines 300, it can determine morphology of the fingerprint above each of fingerprint detection units.

Another embodiment of the invention provides a display device comprising a fingerprint detection circuit in any one of the above embodiments.

As discussed above, due to the presence of the output amplification element in the fingerprint detection circuit, the induced current caused by the change of the quantity of electricity in the sensor capacitor caused by finger touch can be amplified, thereby determining morphology of the fingerprint overlaying the fingerprint detection circuit.

In the embodiments of the invention, specific disposition of the fingerprint detection circuit is not defined. As an example, the fingerprint detection circuit maybe arranged in a non-display region of the display device. In this case, specific structures of the sensor capacitor are not defined, as long as charges may be stored. For the purpose of realizing narrow frame of the display device, in at least some of embodiments, the fingerprint detection circuit may be disposed in the display region. In such embodiments, the sensor capacitor may be made of transparent conductive materials.

The display device may be a device having a display function or component such as a mobile phone, a tablet PC, a navigator, a notebook PC.

What is described above is related to the illustrative embodiments of the disclosure only and not limitative to the scope of the disclosure; the scopes of the disclosure are defined by the accompanying claims.

The present application claims priority from Chinese Application No. 201610022264.6, filed on Jan. 13, 2016 the disclosure of which is incorporated herein by reference in its entirety

What is claimed is:

1. A fingerprint detection circuit, comprising:
charging lines;
data lines, insulated from the charging lines;
output lines, insulated from the charging lines and insulated from the data lines; and
at least one fingerprint detection unit, the at least one fingerprint detection unit consisting of:
a sensor capacitor comprising a first terminal and a second terminal;
a switch transistor, the switch transistor comprising an input terminal, an output terminal, and a control terminal, the input terminal of the switch transistor being coupled with one of the charging lines and configured to be a charging terminal of the at least one fingerprint detection unit, and the output terminal of the switch transistor being coupled with the first terminal of the sensor capacitor; and
an output amplification element, configured for amplifying and outputting a current input to the output amplification element via one of the data lines, the output amplification element comprising a control terminal, an input terminal, and an output terminal, the control terminal of the output amplification element being coupled with the second terminal of the sensor capacitor, the output terminal of the output amplification element being configured to be an output terminal of the at least one fingerprint detection unit, an input terminal of the output amplification element being coupled with the one of the data lines, and the output terminal of the output amplification element is coupled with one of the output lines.

2. The fingerprint detection circuit of claim 1, wherein the control terminal of the switch transistor functions as a control terminal of the at least one fingerprint detection unit.

3. The fingerprint detection circuit of claim 1, wherein the output amplification element is a triode, a gate electrode of the triode functions as the control terminal of the output amplification element, a first electrode of the triode functions as the input terminal of the output amplification element, and a second electrode of the triode functions as the output terminal of the output amplification element.

4. The fingerprint detection circuit of claim 3, wherein a number of the data lines is the same as a number of rows of the fingerprint detection units, fingerprint detection units in a same row correspond to a same data line.

5. The fingerprint detection circuit of claim 4, further comprising scan lines, wherein a number of the scan lines is the same as the number of rows of the fingerprint detection units, fingerprint detection units in the same row correspond to a same scan line, and the control terminal of the switch transistor is coupled with a corresponding scan line.

6. The fingerprint detection circuit of claim 5, wherein the data lines and the scan lines are arranged as parallel to each other.

7. The fingerprint detection circuit of claim 1, wherein a number of the charging lines is the same as a number of columns of the fingerprint detection units, fingerprint detection units in a same column correspond to a same charging line, and the charging terminal of the at least one fingerprint detection unit is coupled with a corresponding charging line.

8. The fingerprint detection circuit of claim 7, wherein a number of the output lines is the same as a number of columns of the fingerprint detection units, fingerprint detection units in a same column correspond to a same output line, and the output terminal of the at least one fingerprint detection unit is coupled with a corresponding output line.

9. The fingerprint detection circuit of claim 8, wherein the charging lines and the output lines are arranged as parallel to each other, for the same column of fingerprint detection units, the charging lines and the output lines are disposed on both sides of the column of fingerprint detection units respectively.

10. The fingerprint detection circuit of claim 9, wherein a distance between the charging lines and the output lines is 40-60 μm, for the same column of fingerprint detection units.

11. The fingerprint detection circuit of claim 7, further comprising scan lines, extension directions of the charging lines and scan lines intersect each other.

12. The fingerprint detection circuit of claim 1, wherein the second terminal of the sensor capacitor comprises first sensor fingers protruding towards the first terminal of the sensor capacitor, the first terminal of the sensor capacitor comprises second sensor fingers protruding towards the second terminal of the sensor capacitor, the first sensor fingers and the second sensor fingers are arranged alternately.

13. The fingerprint detection circuit of claim 12, wherein both the first terminal and the second terminal of the sensor capacitor are made of a transparent conductive material.

14. A display device comprising the fingerprint detection circuit of claim 1.

15. The display device of claim 14, wherein the fingerprint detection circuit is disposed in a display region of the display device.

16. The fingerprint detection circuit of claim 1, wherein the switch transistor is configured for charging the sensor capacitor, and the sensor capacitor is configured for storing a quantity of electricity that the output amplification element operates in an amplifying region.

* * * * *